United States Patent Office 3,505,572
Patented Apr. 7, 1970

3,505,572
ACTIVE ELEMENT INCLUDING THIN FILM HAVING DEEP ENERGY LEVEL IMPURITY IN COMBINATION WITH ELECTROSTRICTION THIN FILM
Akio Yamashita, Ikeda-shi, and Takehiro Tuzaki, Toyonaka-shi, Japan, assignors to Matsushita Electric Industrial Co., Ltd., Osaka, Japan, a corporation of Japan
Filed Nov. 13, 1967, Ser. No. 682,050
Claims priority, application Japan, Nov. 15, 1966, 41/75,674
Int. Cl. H01l *11/00, 11/14*
U.S. Cl. 317—234                    1 Claim

ABSTRACT OF THE DISCLOSURE

This specification discloses a novel thin film active element comprising a first solid thin film formed of a solid such as a semiconductor, an insulator or the like having a forbidden band with an impurity added thereto and provided with a plurality of electrodes, and a second solid thin film capable of producing the electrostrictive effect and provided with a plurality of electrodes, wherein said second solid thin film is superposed upon said first solid thin film to be in contact with the latter, a control signal is supplied to the electrodes of said second solid thin film to vibrate the latter, and a resulting wave motion is transmitted to said first solid thin film to control the electrical characteristics thereof.

---

This invention relates to a thin film active element utilizing thin films to produce an amplifying action.

Among the conventional thin film active elements are the MOS type thin film element using CdS, element utilizing the tunnel effect of an oxide film, and the like.

In the MOS type thin film element, two ohmic electrodes are provided on a CdS thin film, an insulating thin film such as $SiO_2$ is coated between these two electrodes, and a gate electrode is provided on the insulating thin film. With such MOS element, a current flowing through the CdS thin film is controlled in accordance with an electric field applied thereto from the gate electrode through the insulating thin fllm.

The tunnel effect active element has such a structure as metal-oxide film-metal thin film-oxide film-metal thin film or metal-oxide film-metal thin film-semiconductor, wherein a tunnel current flowing through the oxide films is controlled in accordance with the potential of the intermediate metal thin film.

In these elements, use is made of an electrical effect such as potential, electric field or the like as the controlling effect.

A primary object of this invention is to provide a thin film active element wherein the controlling effect is produced by the medium of a wave such as sound wave, supersonic wave or the like.

Other objects, features and advantages of this invention will become apparent from the following description taken in conjunction with the accompanying drawings, in which.

Figure 1:
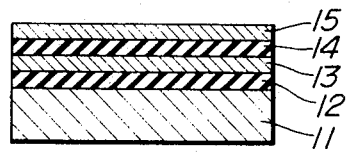
FIGURE 1 is a sectional view showing the thin film active element according to an embodiment of this invention.

The operational principle of the thin film active element of this invention will now be described in connection with an embodiment thereof. FIGURE 1 shows the principal structure of the thin film active element according to this invention, wherein the reference numeral 11 represents a metal substrate, and 12 a solid thin film provided on the metal substrate 11, said solid thin film 12 being formed of a semiconductor, insulator or the like doped with an impurity forming a deep energy level in the forbidden band. The reference numeral 13 denotes a metal electrode provided on the solid thin film 12, and 14 a solid thin film provided on the metal electrode 13, said solid thin film 14 being formed of a material such as a semiconductor, insulator or the like which produces the electrostrictive effect. The reference numeral 15 indicates a metal electrode provided on the solid thin film 14. The term "electrostrictive effect" is used to denote the phenomenon wherein the solid film changes its dimensions to generate mechanical waves or mechanical oscillations in response to an electric field.

By applying a voltage between the metal electrodes 13 and 15, a transversal wave or longitudinal wave is generated due to the electrostrictive effect of the solid thin film 14, and it is transmitted to the solid thin film 12 containing the impurity defining the deep level. The propagation of the wave causes a distortion within its elastic limit in the neighborhood of the impurity atoms forming the deep level, thus shortening the life time of the carriers.

As a result, the current I flowing between the metal electrodes 11 and 13 is increased in accordance with the flowing equation:

$$I = \sqrt{ekT}\, n_i{}^2 \left( \sqrt{\frac{\mu_n}{\tau_n}} \frac{1}{P_p} + \sqrt{\frac{\mu_p}{\tau_p}} \frac{1}{n_n} \right) \left( \exp\left(\frac{ev}{kT}\right) - 1 \right)$$

In the above equation, $e$: Electric charge
$k$: Boltzman's constant
$n_i$: Carrier density of an intrinsic semiconductor
$n_n$: Electron density of an $n$ type semiconductor
$\mu_n$: Mobility of electron
$\mu_p$: Mobility of hole
$\tau_n$: Life time of electron
$\tau_p$: Life time of hole
$P_p$: Hole density of a P type semiconductor
$v$: Potential In this way, a thin film active element is produced which has a remarkably high input impedance and is capable of current amplification and power amplification.

It is to be noted here that the solid thin film 12 constitutes the most important feature of this invention. The inventors have already discovered that if a solid such as a semiconductor, insulator or the like having a forbidden band is doped with an impurity defining a deep energy level in the forbidden band, the resistance of the solid is greatly varied through application of a low pressure thereto. It has been found that this is due to the fact that if a solid having a forbidden band is doped with an impurity forming a deep level, such solid becomes mechanically fragile. From this, the inventors considered that by adding an impurity defining a deep level to a solid, a high energy unstable condition is established in the solid so that defects such as distortion or the like are caused to occur in the solid due to a slight force. Actually, the resistance is changed by a force of about $10^3$ g./cm.$^2$. Consequently, the means through which the wave is transmitted to the solid thin film may be any solid thin film with the electrostrictive effect, which may be formed of ZnS, ZnO, CdS or the like belonging to the class of wurtzite type crystal, GaAs, ZnS or the like belonging to the class of sphalerite type crystal, or the like. An insulator such as rock crystal or the like may equally be used.

Further description will now be made of the embodiment of this invention.

Silicon (Si) is vacuum-deposited on a metal substrate of tantalum (Ta) together with copper (Cu) to form a silicon thin film containing copper. Vacuum-deposited on the resulting silicon thin film is indium (In) on which is in turn vacuum-deposited CdS. Thereafter, indium is vacuum-deposited on CdS. Thus, there is produced an element of such a structure as shown in FIGURE 1.

Assume that an A.C. signal is applied between the indium electrodes, then a wave motion will be transmitted to the silicon thin film due to the electrostrictive of CdS, with a result that the resistance of the silicon thin film is varied.

Figure 2:
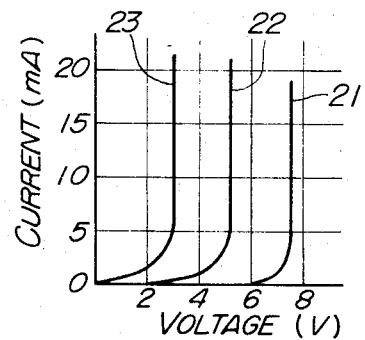
FIGURE 2 is a view showing the voltage-current characteristics of the element as shown in FIGURE 1.

FIGURE 2 shows the voltage (V)-current (ma.) characteristics as a pressure is applied to the element. The curve 21 indicates the case where no pressure is applied, and the curve 22 and 23 show the case where a pressure of $2.5 \times 10^2$ g./cm.$^2$ is applied and the case where a pressure of $7.6 \times 10^2$ g./cm.$^2$ is applied, respectively.

The frequency response of the present element depends upon the amplitude of a wave to be applied. Normally, the element can operate up to the super-sonic range.

In the foregoing, for the convenience of illustration, the element of the present invention has been described as being in the simplest form thereof as shown in FIGURE 1. However, it is possible to use an insulator substrate having metal electrodes provided thereon instead of the metal substrate 11. It is also possible to employ such a structure as shown in FIGURE 3, wherein the reference numeral 31 represents an insulator substrate, 32 a solid thin film formed on the surface of the substrate 31 and having a forbidden band in which is contained a deep-level impurity, 33 a metal electrode provided on the solid thin film 32, 34 an insulator thin film extending over both the solid thin film 32 and the metal electrode 33, 35 a metal electrode provided on the surface of the thin film 34, 36 a solid thin film with the electrostrictive which is formed on the surface of the electrode 35, and 37 a metal electrode provided on the surface of the solid thin film 36.

Figure 3:
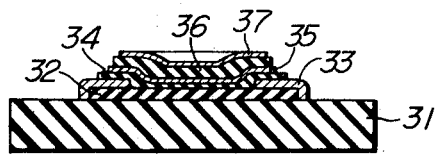
FIGURE 3 is a sectional view showing another embodiment of this invention.

The principle of the FIGURE 3 element is completely the same as that of the element as shown in FIGURE 1. The only difference between the element of FIGURE 3 and that of FIGURE 1 is that in the former, the current passage is formed transversally with respect to the solid thin film 32 with the forbidden band containing the deep-level impurity.

As described above in detail, the thin film active element of this invention has a high frequency response speed and a high input impedance which are features which could not be realized with the conventional active elements. Furthermore, the present element is completely different from the transistors since the carrier to be controlled are the majority carrier in the solid thin film, and it will fined extensive industrial use when it is utilized as an amplifier element.

More than two electrodes may be provided on the solid thin film containing a deep-level impurity. In such case, too, substantially the same effect can be produced. These elecetrodes may be attached either through ohmic connection or through rectifying connection.

What is claimed is:

1. An active element comprising: an electrostrictive effect thin film; a pair of electrodes on the opposite sides of said electrostrictive effect thin film, said electrostrictive effect thin film producing a mechanical wave when an electric field is applied across said electrodes; and a semiconductive thin film having a deep energy level impurity, said semiconductive thin film mechanically and operatively associated with said electrostrictive effect thin film to receive mechanical oscillations of said mechanical wave for thereby changing the conductivity of said semiconductive thin film in response to the received mechanical oscillations.

References Cited

UNITED STATES PATENTS

| | | | |
|---|---|---|---|
| 2,898,477 | 8/1959 | Hoesterey | 307—88.5 |
| 3,388,334 | 6/1968 | Adler | 330—5.5 |
| 3,287,506 | 11/1966 | Hähnlein | 179—110 |

JOHN W. HUCKERT, Primary Examiner

MARTIN H. EDLOW, Assistant Examiner

U.S. Cl. X.R.

310—8.1